(12) United States Patent
Mortazawi et al.

(10) Patent No.: US 9,768,708 B2
(45) Date of Patent: Sep. 19, 2017

(54) WIDE DYNAMIC RANGE RECTIFIER CIRCUITS

(71) Applicant: THE REGENTS OF THE UNIVERSITY OF MICHIGAN, Ann Arbor, MI (US)

(72) Inventors: Amir Mortazawi, Ann Arbor, MI (US); Xiaoyu Wang, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 0 days.

(21) Appl. No.: 15/259,634

(22) Filed: Sep. 8, 2016

(65) Prior Publication Data
US 2017/0070160 A1 Mar. 9, 2017

Related U.S. Application Data

(60) Provisional application No. 62/215,376, filed on Sep. 8, 2015.

(51) Int. Cl.
*H02M 7/06* (2006.01)

(52) U.S. Cl.
CPC .................................. *H02M 7/06* (2013.01)

(58) Field of Classification Search
CPC .......... H02M 7/06; H02M 7/066; H02M 7/08; H02J 5/00
See application file for complete search history.

(56) References Cited

U.S. PATENT DOCUMENTS

| | | | |
|---|---|---|---|
| 7,535,133 B2 | 5/2009 | Perreault et al. | |
| 8,830,709 B2 | 9/2014 | Perreault | |
| 8,963,644 B2 | 2/2015 | Ma et al. | |
| 2008/0225564 A1* | 9/2008 | Bohm | H02M 3/07 363/126 |
| 2011/0069516 A1* | 3/2011 | Greene | H02J 1/10 363/126 |
| 2015/0003131 A1* | 1/2015 | Do | H02M 7/06 363/126 |
| 2016/0315478 A1* | 10/2016 | Chen | H02J 5/00 |

* cited by examiner

*Primary Examiner* — Gary L Laxton
(74) *Attorney, Agent, or Firm* — Harness, Dickey & Pierce, P.L.C.

(57) ABSTRACT

An adaptive power distribution system is presented for extending the dynamic range of AC/RF rectifiers. The power distribution system distributes the AC/RF input power amongst several different rectifier cells adaptively based on input power level. Consequently, high rectification efficiency can be maintained over a very wide dynamic range.

15 Claims, 7 Drawing Sheets

WIDE DYNAMIC RANGE RECTIFIER CIRCUITS

CROSS-REFERENCE TO RELATED APPLICATIONS

This application claims the benefit of U.S. Provisional Application No. 62/215,376, filed on Sep. 8, 2015. The entire disclosure of the above application is incorporated herein by reference.

FIELD

The present disclosure relates to a technique for improving the dynamic range of AC-to-DC and RF-to-DC rectifiers.

BACKGROUND

Rectifier circuits that maintain a high efficiency over a wide dynamic range are essential in many AC-to-DC and RF-to-DC conversion applications, such as wireless power transfer (WPT) and wireless power harvesting (WPH) systems, power sensing and measurement, communication circuits and so on.

WPH and WPT systems performance can significantly benefit from wide dynamic range high efficiency rectifier circuits. WPH systems are designed to collect and harvest the ambient electromagnetic (EM) energy in the environment, convert it to DC and ultimately store the harvested energy and supply power to various devices and sensors. Typical applications of WPH systems include structural health monitoring systems (SHM), Internet of Things (IoT), large-terrain information gathering systems, etc. WPT systems are designed for contactless electrical power transfer between transmitters and receivers that are electrically or magnetically coupled together. Typical applications of WPT systems include RFID tags, biomedical implants, wireless charging of electronic devices and electrical vehicles, etc. In both WPH and WPT systems, the rectifier is one of the key components that converts the AC/RF power to DC. Because the AC/RF power provided to the rectifier device in both wireless power harvesting and wireless power transmission systems is subject to fluctuations, (for example due to variation of the ambient power density in WPH, and variation of distance between the transmitter and receiver in WPT systems) it is highly desirable for the rectifier used in a WPH and WPT systems to provide a wide dynamic range. This means that the rectifier should provide high efficiencies as input power level changes (i.e. to maintain high efficiencies over a large range of input power levels).

However, the dynamic range for conventional rectifier circuits is often very limited due to rectifying devices nonlinearities (diodes, transistors, etc.). The overall efficiency of the rectifiers ($\eta_{overall}$) is determined by the ratio of the DC output power over the available power from the source, and is influenced by both the device rectification efficiency ($\eta_{rect}$) and the rectifier reflection coefficient ($\Gamma$), as described in equation (1):

$$\eta_{overall} \triangleq \frac{P_{dc}}{P_{av}} = (1 - |\Gamma|^2)\eta_{rect} \quad (1)$$

$\Gamma$ is minimized when the RF or AC source is impedance matched to the rectifier circuit. If there is impedance mismatch between the source and the rectifier, a portion of the available power at the input to the rectifier is reflected thereby adversely impacting rectifier's efficiency. The rectifier's input impedance is power-dependent, making impedance matching very challenging as the input power level changes. Meanwhile, $\eta_{rect}$ is also dependent on the input power level. For most rectifying devices, $\eta_{rect}$ increases with the input power level until the device saturation point ($P_{sat}$) where the breakdown effects become significant. Since both $\Gamma$ and $\eta_{rect}$ are dependent on the input power level, $\eta_{overall}$ is often optimized at a specific power level. Hence, $\eta_{overall}$ experience significant degradation as the input power to the rectifier varies away from its optimize level.

This disclosure describes novel wide dynamic range rectifier arrays capable of maintaining high rectification efficiencies as the input power varies. The wide dynamic range rectifier array consists of several rectifier circuits optimized for different power levels, as well as an adaptive power distribution network that delivers the AC or RF input power among these rectifier cells according to the power level. The rectifiers can use diodes or transistors and therefore the design approach described is very general. At lower power levels, most of the power is delivered to a rectifier optimized for low power operation; while at higher power levels, most of the power is delivered to the rectifier optimized for high power operation and so on. Following such an approach, high $\eta_{rect}$ can be achieved over a wide range of power level variation. At the same time the dynamic impedance of different rectifier cells are transformed as a power level changes in such a way that they compensate each other's impedance variation as input power level changes. Consequently, the variation of the input impedance of the entire wide dynamic range rectifier array is made stable as power level varies. Therefore its input reflection coefficient of the rectifier array is maintained at low values as power level varies. Both improvement in $\eta_{rect}$ and allow for high $\eta_{overall}$ to be achieved over a wide range of input power level variation.

SUMMARY

This section provides a general summary of the disclosure, and is not a comprehensive disclosure of its full scope or all of its features.

An adaptive power distribution system is presented for improving the dynamic range of rectifiers. The adaptive power distribution system includes an input port, and at least two circuit branches arranged in parallel. The input port is configured to receive AC or RF input power. The first circuit branch is comprised of a first input node, a first impedance transformation circuit and a first rectifier, where the first input node is electrically coupled to the input port and the first impedance transformation circuit is electrically connected between the first input node and the first rectifier. Similarly, the second circuit branch is comprised of a second input node, a second impedance transformation circuit and a second rectifier, wherein the second input node is electrically coupled to the input port and the second impedance transformation circuit is electrically connected between the first input node and the second rectifier. The first impedance transformation circuit and the second impedance transformation circuit are configured so that ratio of conductance at input of the first rectifier to conductance at input of the second rectifier decreases with increases in magnitude of the AC or RF power while sum of the conductance at the input of the first rectifier with the conductance at the input of the second rectifier remains substantially constant over variations in magnitude of the AC or RF power.

In one aspect, the sum of susceptance at input of the first rectifier and susceptance at input of the second rectifier is substantially constant as magnitude of AC or RF power varies.

The impedance transformation circuit may include a passive circuit element coupled in series with the respective rectifier. The passive circuit element can be implemented by one of a capacitor, an inductor or a transmission line. The impedance transformation circuit may further include a reactive element interconnecting the first impedance transformation circuit and the second impedance transformation circuit.

Further areas of applicability will become apparent from the description provided herein. The description and specific examples in this summary are intended for purposes of illustration only and are not intended to limit the scope of the present disclosure.

DRAWINGS

Figure 1:
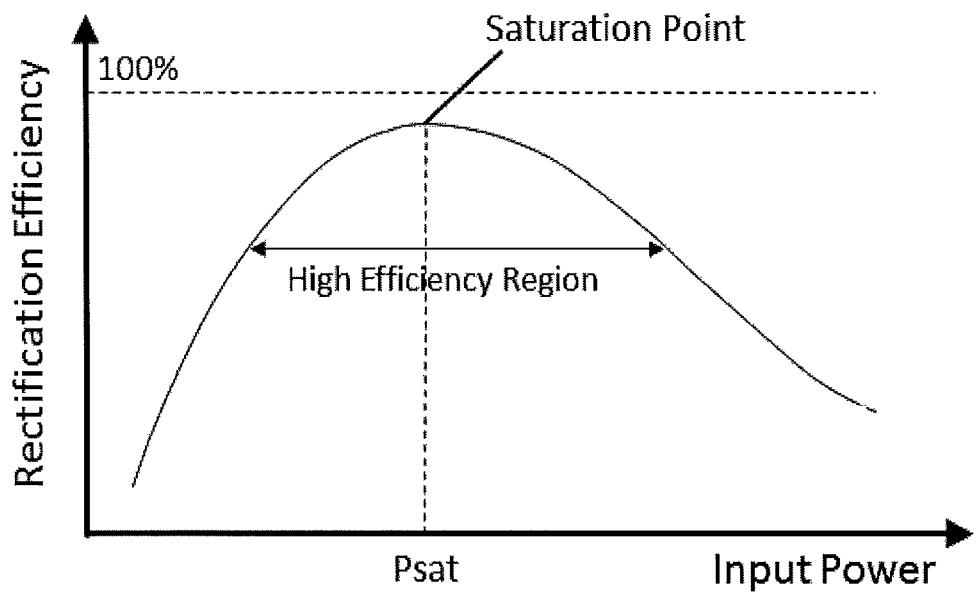
FIG. 1 is a graph showing the typical rectification efficiency of a rectifying device as a function of input power level.

The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

Example embodiments will now be described more fully with reference to the accompanying drawings.

FIG. 1 shows the typical rectification efficiency ($\eta_{rect}$) for a rectifying device as a function of input power. The rectification efficiency is highly power-dependent. As input power level increases, the rectification efficiency increases until the saturation point where the breakdown effects become dominant.

Figure 2:
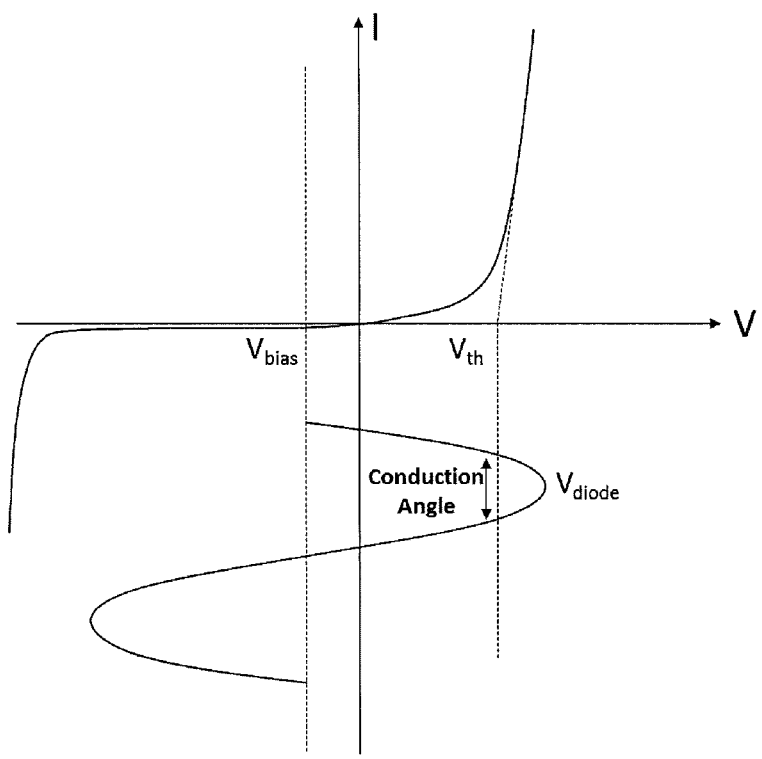
FIG. 2 is a graph showing the conduction angle of rectifying devices.

FIG. 2 shows the conduction angle of rectifying devices. The rectifying device conducts current when the voltage across it exceeds its threshold voltage. The conduction angle increases as input power increases.

Figure 3:
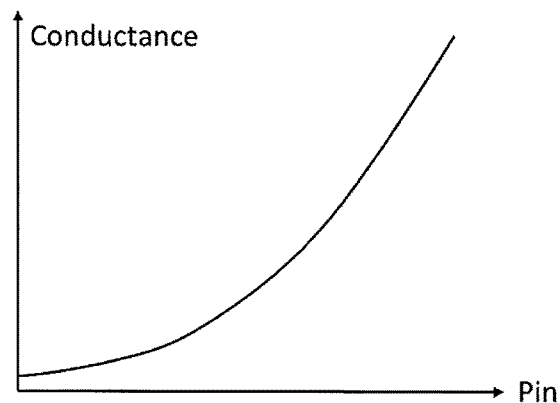
FIG. 3 is a graph showing an example of the input conductance for a rectifying device as a function of input power level variation.

FIG. 3 shows an example of the input conductance as a function of input power level for a rectifying device. Rectifiers typically exhibit an increasing input conductance with input power, due to increase in conduction angle. Because of the power-dependent input impedance of diode or transistors rectifiers, it is usually difficult to minimize the reflection coefficient $\Gamma$ in a wide range of power levels. As described in Equation (1) above, the overall efficiency ($\eta_{overall}$) is a function of both $\eta_{rect}$ and $\Gamma$, and is highly power-dependent. In conventional rectifier designs, $\eta_{overall}$ is often optimized at a specific power level, providing a very narrow dynamic range.

An adaptive power distribution system is presented in this disclosure. The system exploits the rectifiers' power dependent nonlinear impedance to achieve adaptive power distribution, and therefore significantly enhances the rectifier's dynamic range.

Figure 4:
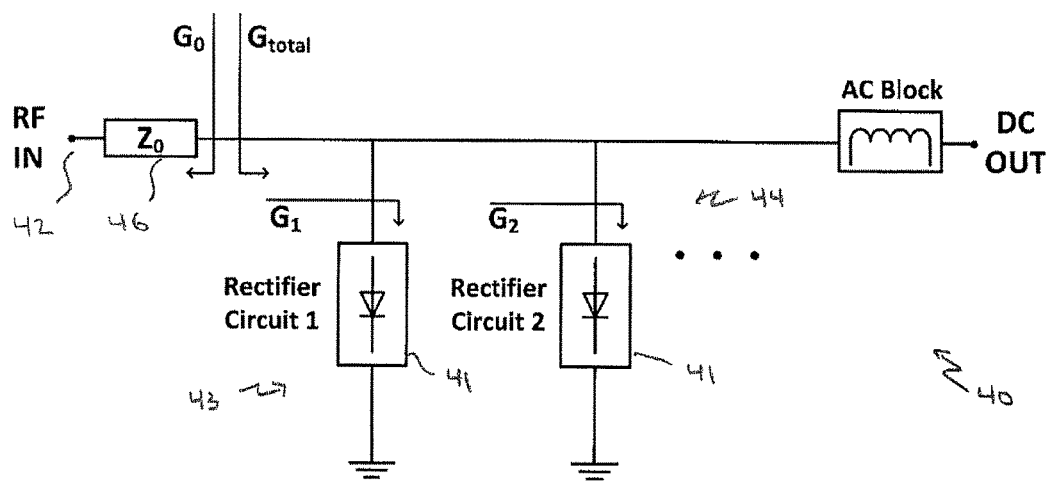
FIG. 4 is a basic block diagram of an example adaptive power distribution system.

FIG. 4 is basic block diagram of an example adaptive power distribution system 40. In this example, the system 40 is comprised of two rectifier cells 41. Each rectifier cell 41 includes a rectifying device and an impedance transformation network as will be further described below. In operation, the total DC output power is the combined output from each of the rectifier devices. While reference is made to a system comprised of two rectifier cells, it is readily understood that the techniques set forth herein may be extended to a system having three or more rectifier cells as well.

More specifically, the adaptive power distribution system 40 includes an input port 42 configured to receive an input signal (e.g., an AC or RF signal), a first circuit branch 43 and a second circuit branch 44, where the second circuit branch 44 is arrange in parallel with the first circuit branch 43. The first circuit branch 43 has an input node electrically coupled to the input port 42. Likewise, the second circuit branch 44 has an input node electrically coupled to the input port 43.

In the example system, the input conductance of Rectifier cell 1 and Rectifier cell 2 (looking into the circuit including both the rectifying device and the impedance transformation network) are denoted as $G_1$ and $G_2$, respectively. Individual impedance transformation networks are designed for each of the rectifying cells, such that $G_1(P_{in})$ is a decreasing function of power, while $G_2(P_{in})$ is an increasing function of power. Ideally, $G_1(P_{in})$ and $G_2(P_{in})$ should follow Equation (2):

$$\begin{cases} G_1(P_{in}) = G_{total} \\ G_2(P_{in}) = 0 \end{cases} (P_{in} \leq P_{1_{sat}}) \quad (2)$$

$$\begin{cases} G_1(P_{in}) = \dfrac{P_{1_{sat}}}{P_{in}} \cdot G_{total} \\ G_2(P_{in}) = \dfrac{P_{in} - P_{1_{sat}}}{P_{in}} \cdot G_{total} \end{cases} \quad (P_{1_{sat}} < P_{in} \le (P_{1_{sat}} + P_{2_{sat}}))$$

$$\begin{cases} G_1(P_{in}) = \dfrac{P_{1_{sat}}}{P_{1_{sat}} + P_{2_{sat}}} \cdot G_{total} \\ G_2(P_{in}) = \dfrac{P_{2_{sat}}}{P_{1_{sat}} + P_{2_{sat}}} \cdot G_{total} \end{cases} \quad (P_{in} > (P_{1_{sat}} + P_{2_{sat}}))$$

where $P_{in}$ is the source power level; $P_{1_{sat}}$ and $P_{2_{sat}}$ are the saturation points for the rectifiers in Rectifier cell 1 and Rectifier cell 2, respectively; $G_{total}$ is the total conductance looking into the entire rectifier array port, and is equal to $G_1 + G_2$.

Figure 5:
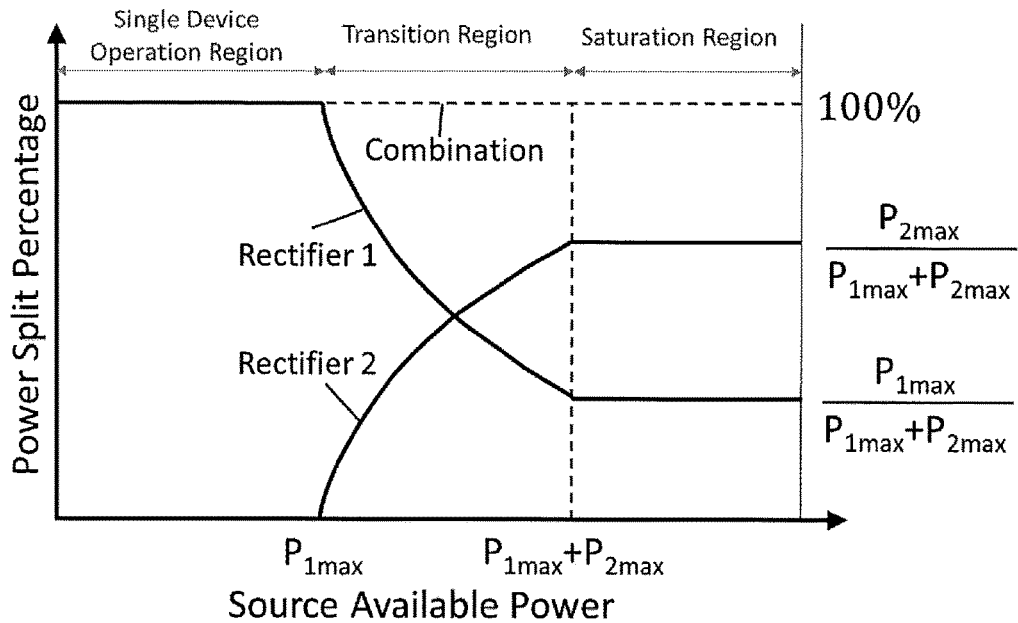
FIG. 5 is a graph showing the input conductance for Rectifier 1 and Rectifier 2, respectively, as function of the available power from the source (ideal case)

FIG. 5 shows the ideal behavior of $G_1(P_{in})$ and $G_2(P_{in})$ as a function of available power from the source. By satisfying equation 2, the variation of $G_1(P_{in})$ and $G_2(P_{in})$ with power cancel each other, therefore the total input conductance $G_{total}$ is maintained constant regardless of source power level. $G_{total}$ is matched to the source impedance with conventional impedance transformation circuits (labeled 46 is FIG. 4). Since $G_{total}$ is stable over power, the reflection coefficient $\Gamma$ can be minimized within a wide range of power levels.

The described approach allows for adaptive power distribution between Rectifier 1 and Rectifier 2. As is illustrated in FIG. 5, a rectifier cell has three operation regions, namely: $P_{in} \le P_{1_{sat}}$; $P_{1_{sat}} < P_{in} \le (P_{1_{sat}} + P_{2_{sat}})$; and $P_{in} > (P_{1_{sat}} + P_{2_{sat}})$. For convenience, the three regions are referred to as single device operation region, transition region and saturation region, as is depicted in FIG. 5.

The real power delivered to the individual rectifiers is denoted as $P_1$ and $P_2$. The power distribution ratio between the rectifiers, $P_1/P_2$, is equal to the conductance ratio between the rectifiers, shown in equation (3):

$$\frac{P_1}{P_2} = \frac{G_1(P_{in})}{G_2(P_{in})} \quad (3)$$

Figure 6:
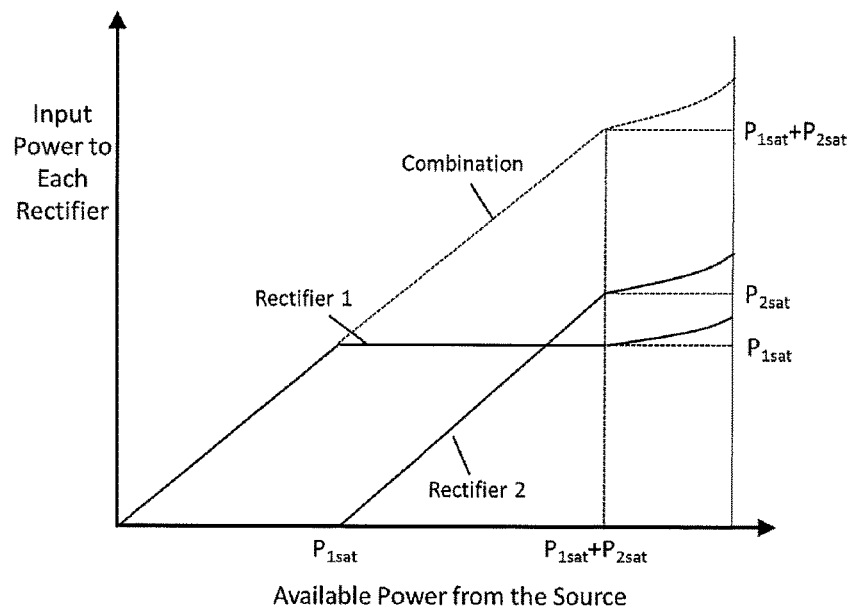
FIG. 6 is a graph showing the RF power that is delivered to each of the rectifier cells, as function of the available power from the source (ideal case)

FIG. 6 shows the ideal input power to each of the rectifier cells, as functions of the available power from the source. In the single device operation region, the conductance ratio $G_1/G_2$ (and therefore $P_1/P_2$) is much higher than 1. Therefore, almost all the input power is delivered to Rectifier cell 1. Since the rectification efficiency increases with input power level (as can be seen in FIG. 2), such an approach will maximize the efficiency under the low-power condition.

As the input power increases beyond $P_{1_{sat}}$, the circuit operates in the transition region. Both rectifiers receive input power and contribute to the DC output power. The power distribution ratio gradually decreases with power, from $P_1 = P_{1_{sat}}$ and $P_2 = 0$ at $P_{in} = P_{1_{sat}}$, to $P_1 = P_{1_{sat}}$ and $P_2 = P_{2_{sat}}$ at $P_{in} = (P_{1_{sat}} + P_{2_{sat}})$. During this transition, $P_1$ remains the same, i.e. $P_1 = P_{1_{sat}}$ and $P_2$ will be $P_2 = P_{in} - P_{1_{sat}}$. In this way, the rectifier in Rectifier cell 1 always operates at its maximum efficiency, while the efficiency of the rectifier in Rectifier cell 2 gradually increases with increasing power level, until it reaches its peak efficiency at $P_{in} = (P_{1_{sat}} + P_{2_{sat}})$.

In the saturation region, the power level delivered to each device receive is beyond its saturation point. In this region, the power distribution ratio $P_1/P_2 = P_{1_{sat}}/P_{2_{sat}}$ is maintained such that the rectification efficiency for the two devices decay at the same rate.

Figure 7:
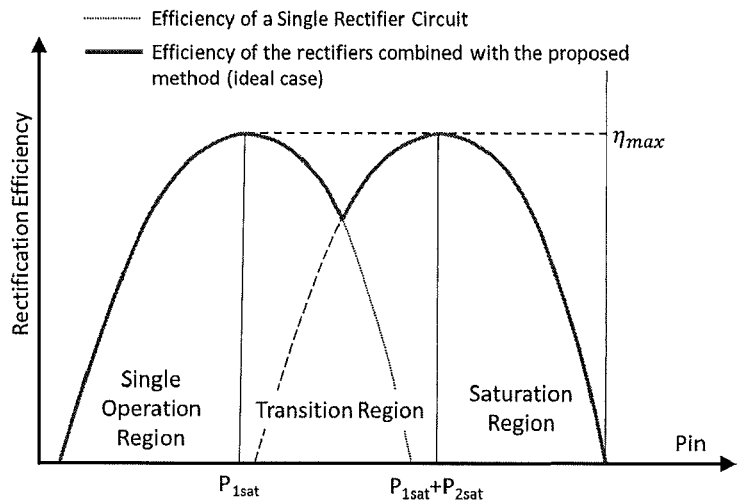
FIG. 7 is a graph that shows the comparison of $\eta_{rect}$ for a single rectifier device and the adaptive power distribution system with two rectifiers.

A comparison between the rectification efficiency of a single rectifier, and the adaptive power distribution system described in this disclosure are shown in FIG. 7. In single device operation region, since all the power is delivered to the rectifier in Rectifier cell 1, the efficiency of the rectifier network is equal to the efficiency of a single rectifier circuit. In saturation region, since both devices reach their breakdown region and decay at the same rate, the efficiency of the rectifier network is equal to the shunt of two rectifiers. In the transition region, Rectifier cell 1 maintains maximum efficiency. The efficiency of Rectifier cell 2 gradually increases with power and reaches maximum efficiency at $P_{in} = P_{1_{sat}} + P_{2_{sat}}$; however, when $P_{in} < P_{1_{sat}} + P_{2_{sat}}$ although the efficiency of Rectifier cell 2 is not maximized, since the RF power delivered to Rectifier cell 2 is small, the degradation of the overall efficiency is small. Therefore, the efficiency of the wide dynamic range rectifier network can approach the outline. In summary, the aforementioned method significantly improves both $\eta_{rect}$ and $\Gamma$ as power level changes, thereby achieving high overall efficiency rectification with a wide dynamic range.

Figure 8:
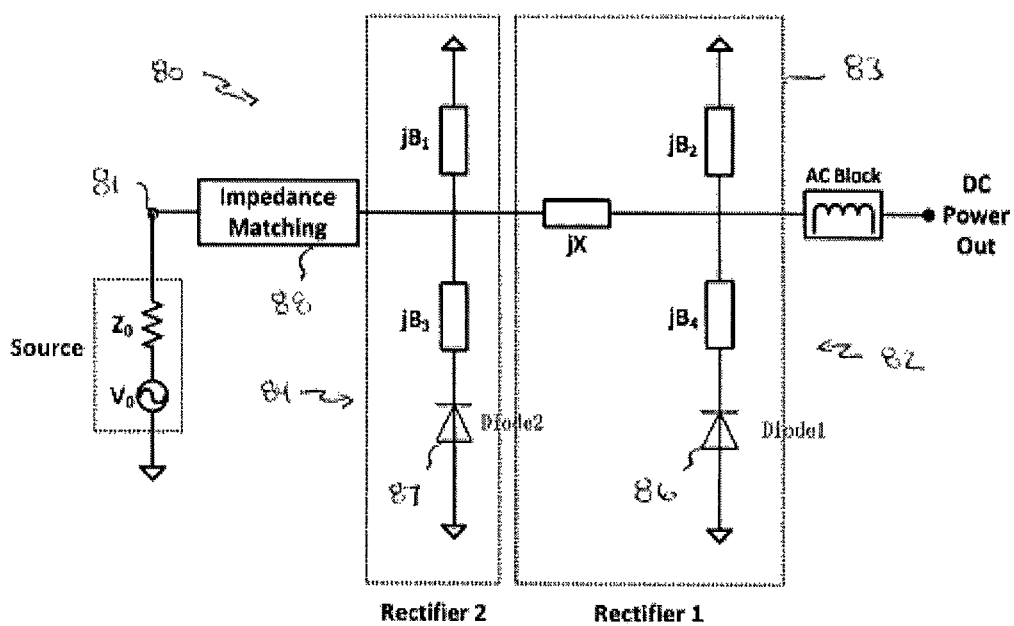
FIG. 8 is a schematic of an example embodiment of the adaptive power distribution system.

FIG. 8 further depicts an example embodiment for the adaptive power distribution system 80. The adaptive power distribution system 80 includes an input port 81, a first circuit branch 82 and a second circuit branch 84, where the second circuit branch 84 is arrange in parallel with the first circuit branch 82. An impedance matching circuit 88 may be interposed between the input port 81 and the remainder of the circuit, such that input impedance of network is matched to the source impedance $Z_0$.

In the example embodiment, the rectifying devices are implemented by diodes 86 although other types of rectifying devices (e.g., transistors, etc.) are contemplated as well. The two rectifying devices are selected such that their saturation points $P_{1_{sat}}$ to $P_{1_{sat}} + P_{2_{sat}}$ covers the desirable power range.

Figure 9:
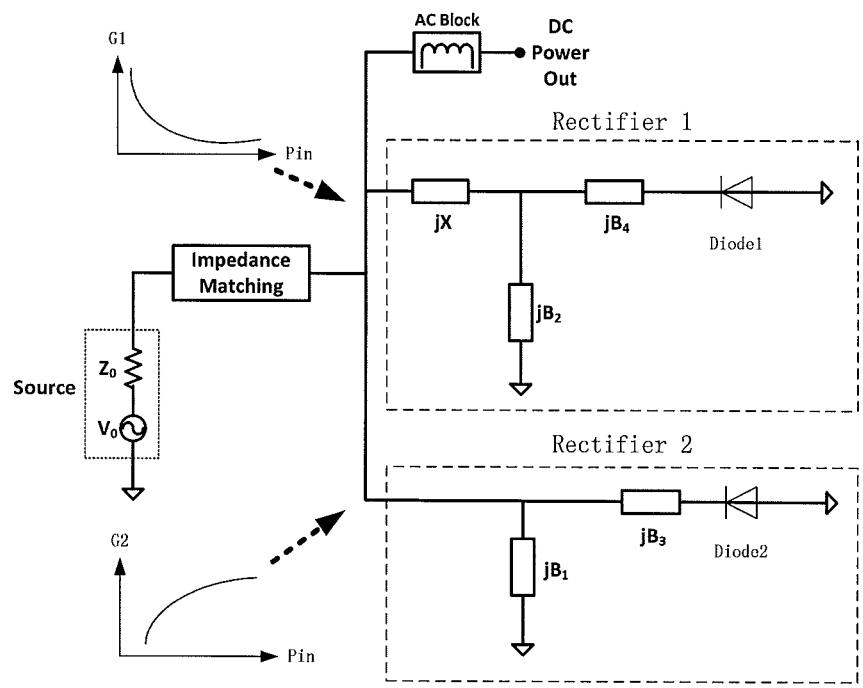
FIG. 9 is a schematic depicting a rearrangement of the example embodiment in FIG. 8 with insets of the input conductance versus power for each rectifier cell.

Each circuit branch includes an impedance transformation network. The first impedance transformation network 83 is electrically connected between the input port 81 and the first diode 86. The first distribution circuit 83 is represented by reactance $jB_2$, $jB_4$ and $jX$. On the other hand, the second impedance transformation network 85 is electrically connected between the input port 81 and the second diode 87. The second distribution circuit 85 is represented by reactance $jB_1$, and $jB_3$. It is readily understood that the reactance can be implemented using one or more lumped components, transmission lines, or a combinations thereof. In one embodiment, the reactance is implemented using inductors and/or capacitors. Other implementations also fall within the scope of this disclosure. The circuit can be rearranged into the form as illustrated in FIG. 9 to simplify its operation description.

During operation, the first circuit branch exhibits a decreasing input conductance with power; while the second circuit branch exhibits an increasing input conductance $G_2$ with power. That is, the first impedance transformation network 82 and the second impedance transformation network 84 are configured so that ratio of conductance at input of the first rectifier 86 to conductance at input of the second rectifier 87 decreases with increases in magnitude of the RF power. Additionally, the sum of the conductance at the input of the first rectifier with the conductance at the input of the second rectifier remains substantially constant over variations in magnitude of the RF power. Thus, the power dividing ratio $P_1/P_2 = G_1/G_2$ is much greater than one in the single device operation region, decreases with input power in the transition, and maintains relatively stable in the saturation region, approaching the proposed adaptive power distribution scheme shown in FIG. 6.

To demonstrate this concept, a 900 MHz two-device rectifier array was constructed. A HSMS2852 high sensitivity rectifier diode is used for low-power rectification, while a HSMS2820 diode which has a higher power capability is used for high-power operation. The circuit is designed with microstrip line impedance matching networks on Rogers RO4003C laminates, using a 1.2 V rechargeable battery as the load. For comparison, a single diode rectifier is designed with the same device and optimized to achieve maximum efficiency at the same frequency.

Figure 10:
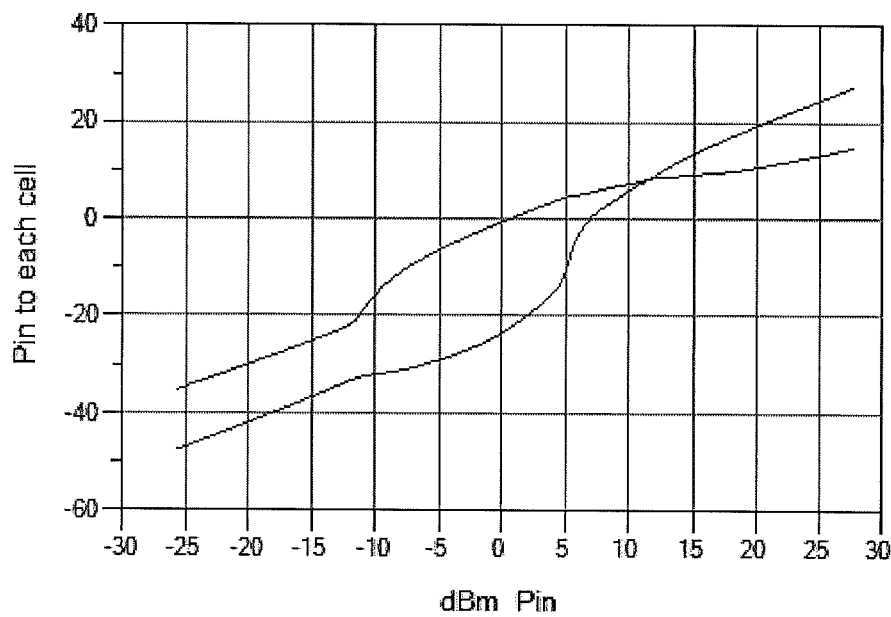
FIG. 10 is a graph showing the simulated RF power that is delivered to each rectifier device as a function of input power, where the solid curve shows the RF power delivered to Rectifier 1 and the dashed curve shows the RF power delivered to Rectifier 2.

FIG. 10 shows the simulation result of the power delivered to each rectifier device, as a function of input power level. It can be seen that the power delivered to Rectifier 1 is much higher than Rectifier 2 below $P_{av}$ of 5 dBm (the single device operation region). Within the $P_{av}$ ranging from 5 dBm to 15 dBm, the power delivered to Rectifier 2 increases as input power increases. This is the transition region of the rectifier circuit. Afterwards, the power distribution ratio remains stable between both rectifiers (the saturation region).

Figure 11:
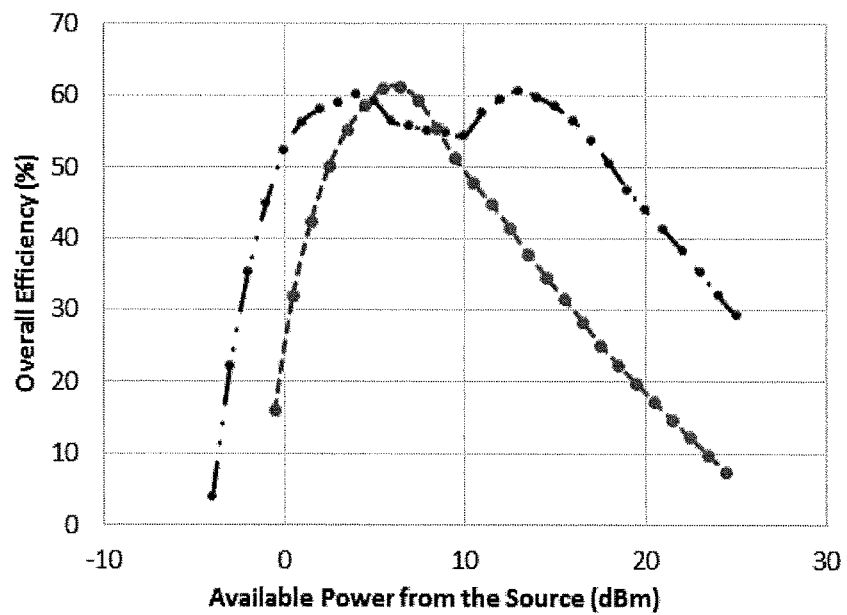
FIG. 11 is a graph showing the measured overall efficiency ($\eta_{overall}$) for the wide dynamic range rectifier array, in comparison with a single diode rectifier circuit optimized for the highest efficiency.

FIG. 11 shows the measured overall efficiency as a function of power. The rectifier array circuit demonstrates >50% overall efficiency over 18.5 dB variation of input power levels (from −0.5 dBm to 18 dBm), which is 11.5 dB wider than the single-diode rectifier.

Figure 12:
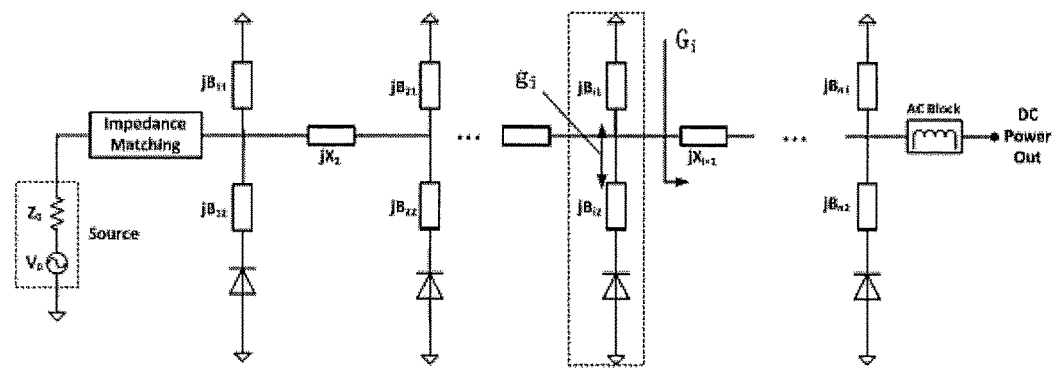
FIG. 12 is a schematic of an embodiment of the adaptive power distribution system having more than three rectifier devices.

The approach described is very flexible and it allows one to design rectifier circuits for any desired dynamic range. For example the circuit topology can be extended to an N-device network to include a larger number of rectifiers (N≥3). An example of an adaptive power distribution system having N rectifiers is shown in FIG. 12. The circuit configuration will appear to be multiple rectifier cells connected in shunt with the correct phase correlations and conductance variation trends. In an N rectifying device array, each device saturation power point is denoted $P_{sat1}, P_{sat2}, \ldots P_{satN}$. Each rectifying device is connected to an impedance transformation network, for example here, formed by $jB_{i1}, jB_{i2}$ and $jX_i$ in FIG. 12 (i=1, 2, ... N). The conductance looking into the network formed by $jB_{i1}, jB_{i2}$ and device i is denoted as $g_i$. From the $(i-1)^{th}$ cell, the conductance looking into the rest of the network is denoted as $G_i$ (i=2, 3, ..., N).

The design conditions are provided below. When input power $P_{in}$ is within the range $$\sum_{k=1}^{i-1} P_{sat\,k} \leq P_{in} < \sum_{k=1}^{i} P_{sat\,k}$$

the conductances $g_i$ and $G_i$ should satisfy:

$$\begin{cases} g_1 + g_2 + g_3 + \ldots + g_{i-1} + g_i = G_{input} \\ g_{i+1} = g_{i+2} = \ldots = g_N = 0 \\ g_1:g_2: \ldots :g_{i-1}:g_i = P_{sat1}:P_{sat2}: \ldots :P_{sat(i-1)}:\left(P_{in} - \sum_{k=1}^{i-1} P_{sat\,k}\right) \end{cases}$$

When $P_{in}<P_{sat1}$, then $g_1=G_{input}$ and $g_2=g_3=\ldots=g_N=0$ and when $P_{in}>\Sigma_{k=1}^{N}P_{sat\,k}$, then the following condition is satisfied:

$$\begin{cases} g_1 + g_2 + g_3 + \ldots + g_N = G_{input} \\ g_1:g_2: \ldots :g_N = P_{sat1}:P_{sat2}: \ldots :P_{satN} \end{cases}$$

Therefore, when the input power $P_{in}$ is small (smaller than $P_{sat1}$), only the rectifier device 1 operates; as $P_{in}$ increases beyond $P_{sat1}$, rectifying device 2 starts to operate. As $P_{in}$ continues to increase, more devices start to conduct, until $P_{in} \geq \Sigma_{k=1}^{N} P_{sat\,k}$ when all devices saturate. The range at which rectifier array maintains its high efficiencies then ranges from $P_{sat1}$ to $\Sigma_{k=1}^{N} P_{sat\,k}$.

Figure 13:
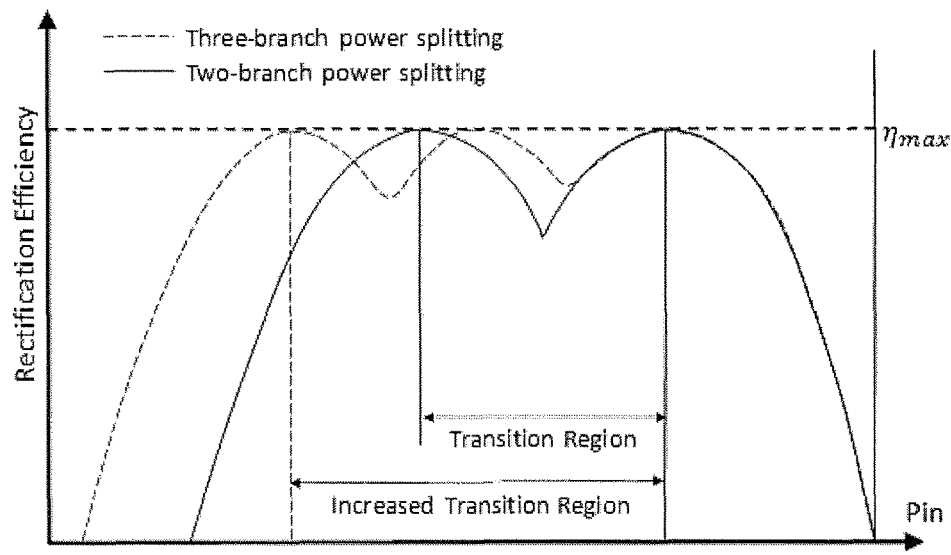
FIG. 13 is a graph showing comparison of $\eta_{rect}$ of a multi-device array (shown with the example of three-way rectifier array) with a two-device rectifier array.
Figure 14:
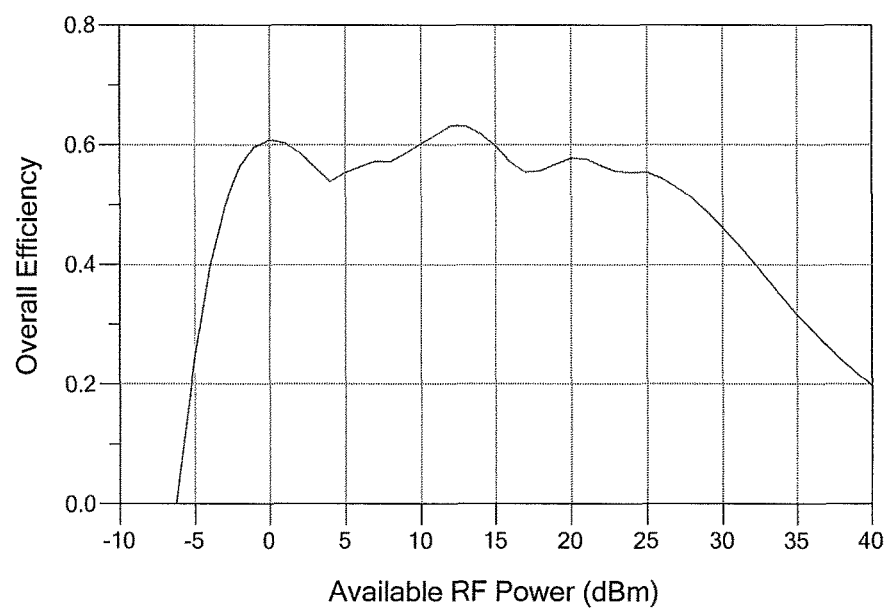
FIG. 14 is a graph showing the simulated $\eta_{overall}$ of a three-device array.

As an example, FIGS. 13 and 14 show the simulated overall efficiency as a function of power. The circuit used for simulation includes three different diodes: HSMS2852 for low-power operation, HSMS2820 for medium-power operation, and HSMS2700 for high-power operation. The rectifier array circuit demonstrates >50% overall efficiency over 32 dB variation of input power levels (from −3 dBm to 29 dBm).

This disclosure is applicable for powering various devices, or for charging rechargeable batteries (in WPT and WPH systems). It is also applicable for voltage regulator circuits such as switch mode dc-dc converters.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An adaptive power distribution system, comprising:
   an input port configured to receive AC or RF power; and
   a first circuit branch, wherein the first circuit branch is comprised of a first input node, a first impedance transformation circuit and a first rectifier, wherein the first input node is electrically coupled to the input port and the first impedance transformation circuit is electrically connected between the first input node and the first rectifier; and
   a second circuit branch arranged in parallel with the first circuit branch, wherein the second circuit branch is comprised of a second input node, a second impedance transformation circuit and a second rectifier, wherein the second input node is electrically coupled to the input port and the second impedance transformation circuit is electrically connected between the first input node and the second rectifier;

wherein the first impedance transformation circuit and the second impedance transformation circuit are configured so that ratio of conductance at input of the first rectifier to conductance at input of the second rectifier decreases with increases in magnitude of the AC or RF power while sum of the conductance at the input of the first rectifier with the conductance at the input of the second rectifier remains substantially constant over variations in magnitude of the AC or RF power.

2. The adaptive power distribution system of claim 1 wherein sum of susceptance at input of the first rectifier and susceptance at input of the second rectifier is substantially constant as magnitude of AC or RF power varies.

3. The adaptive power distribution system of claim 1 wherein at least one of the first impedance transformation circuit and the second impedance transformation circuit includes a first passive circuit element electrically coupled in series with the respective rectifier and a second passive circuit element electrically coupled between the respective input node and ground.

4. The adaptive power distribution system of claim 3 further comprises a reactive element interconnecting the first impedance transformation circuit and the second impedance transformation circuit.

5. The adaptive power distribution system of claim 4 wherein the passive circuit element is implemented by one of a capacitor, an inductor or a transmission line.

6. The adaptive power distribution system of claim 1 wherein at least one of the first rectifier and the second rectifier is further defined as a diode.

7. The adaptive power distribution system of claim 1 wherein at least one of the first rectifier and the second rectifier is further defined as a transistor.

8. An adaptive power distribution system, comprising:
an input port configured to receive AC or RF power; and
a first circuit branch, wherein the first circuit branch includes a first impedance transformation circuit electrically interconnecting a first input node to a first rectifier, wherein the input port is electrically coupled to the first input node and the first impedance transformation network is configured to decrease conductance at input of the first rectifier as the AC or RF power increases; and
a second circuit branch arranged in parallel with the first circuit branch, wherein the second circuit branch includes a second impedance transformation circuit electrically interconnecting a second input node to a second rectifier, wherein the input port is electrically coupled to the second input node and the second impedance transformation circuit is configured to increase conductance at input of the second rectifier as the AC or RF power increases;
wherein the first impedance transformation circuit and the second impedance transformation circuit are configured so that ratio of conductance at input of the first rectifier to conductance at input of the second rectifier decreases with increases in magnitude of the AC or RF power while sum of the conductance at the input of the first rectifier with the conductance at the input of the second rectifier remains substantially constant over variations in magnitude of the AC or RF power.

9. The adaptive power distribution system of claim 8 wherein wherein the first impedance transformation circuit and the second impedance transformation circuit are configured so that ratio of conductance at input of the first rectifier to conductance at input of the second rectifier decreases with increases in magnitude of the AC or RF power while sum of the conductance at the input of the first rectifier with the conductance at the input of the second rectifier remains substantially constant over variations in magnitude of the AC or RF power and the sum of susceptance at input of the first rectifier and susceptance at input of the second rectifier is substantially constant as magnitude of AC or RF power varies.

10. The adaptive power distribution system of claim 8 wherein at least one of the first impedance transformation circuit and the second impedance transformation circuit includes a first passive circuit element electrically coupled in series with the respective rectifier and a second passive circuit element electrically coupled between the respective input node and ground.

11. The adaptive power distribution system of claim 10 further comprises a reactive element interconnecting the first impedance transformation circuit and the second impedance transformation circuit.

12. The adaptive power distribution system of claim 11 wherein the passive circuit element is implemented by one of a capacitor, an inductor or a transmission line.

13. The adaptive power distribution system of claim 8 wherein at least one of the first rectifier and the second rectifier is further defined as a diode.

14. An adaptive power distribution system, comprising:
an input port configured to receive AC or RF power; and
n circuit branches electrically coupled to the input port and arranged in parallel with each other, wherein each of the n circuit branches includes a rectifier; and
an impedance transformation network interconnecting the input port to the n circuit branches, wherein the impedance transformation network is configured so that conductance at input of a given rectifier in the n circuit branches is higher than conductance at input at each of remaining rectifiers in the n circuit branches and ratio of the conductance at input of the given rectifier to conductance at input of each of the remaining rectifiers decreases as power increases until the given rectifier reaches saturation,
wherein, after the given rectifier reaches saturation, the impedance transformation network is further configured so that conductance at input of another rectifier in the n circuit branches is higher than conductance at input at each of rectifiers in the n circuit branches not operating in saturation and ratio of the conductance at input of the another rectifier to conductance at input of each of the remaining rectifiers decreases as power increases until the another rectifier reaches saturation.

15. The adaptive power distribution system of claim 14 wherein sum of the conductance at the input of the rectifiers in the n circuit branches remains substantially constant over variations in magnitude of the AC or RF power.

* * * * *